Oct. 1, 1929.   C. BRÜSSELBACH   1,729,926
STEERING POST CONTROL
Filed Aug. 20, 1928
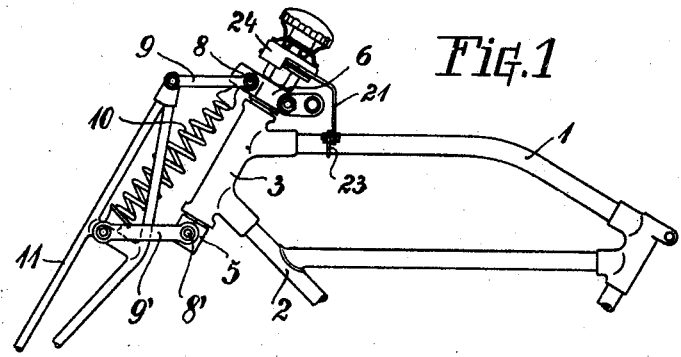
Fig.1
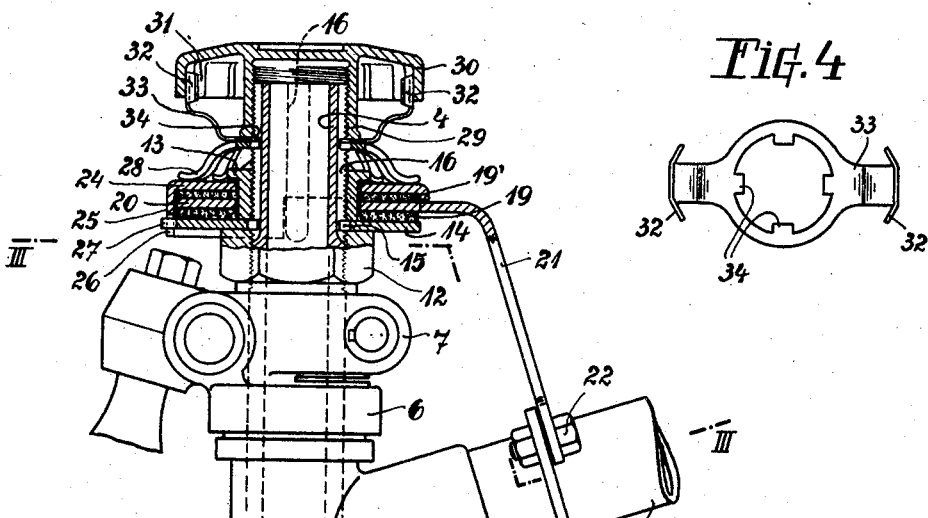
Fig.4
Fig.2
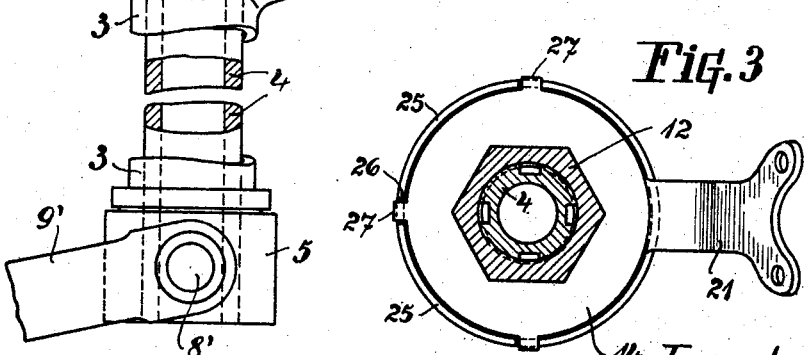
Fig.3
Inventor
Conrad Brüsselbach
by
Attorney Patented Oct. 1, 1929

1,729,926

UNITED STATES PATENT OFFICE

CONRAD BRÜSSELBACH, OF COLOGNE-SULZ, GERMANY

STEERING-POST CONTROL

Application filed August 20, 1928, Serial No. 300,928, and in Germany June 14, 1928.

The present invention has reference to means for dampingly controlling the steering movements of the front wheel of motorcycles, and it relates more particularly to controlling means of this character comprising a plurality of cooperating friction members, two of which are rigidly mounted on the steering post, whilst a third member, interposed between the other two, is rigidly mounted on the cycle frame, and adjustable spring means for forcing and retaining the several friction members into more or less close frictional contact, and the main object of the invention is to simplify and cheapen the construction and to reduce the proportions of such a steering control without reducing its efficiency over similar devices which are relatively complicated in construction and of considerably larger dimensions, especially in axial extent.

In order to make my invention more readily understood it will now be described in detail in connection with the accompanying drawing, in which Fig. 1 is a fragmentary side view of a cycle frame with the improved steering control in position. Fig. 2 is an enlarged side elevation, partly in section, of the damping device with adjacent frame portions. Fig. 3 is a cross-section, seen from below, on line III—III of Fig. 2; and Fig. 4 is a plan view of the safety spring member.

Within the steering head tube 3, which connects the upper frame tube 1 with the lower frame tube 2, there is rotatably journaled the tubular steering post 4 by means of the upper and lower heads 6 and 5 respectively. The upper head 6 is secured on the post 4 by means of the clamping collar 7 in well known manner. The front wheel fork 11, by way of example, is connected to the steering post by means of the upper link pair 9 and the lower link pair 9', the upper links 9 being pivoted at 8 on the head 6, and the lower links 9' being pivotally secured at 8' on the head 5. A helical spring 10 connects the outer ends of the lower link pair with the inner ends of the upper link pair, the described parts forming a spring suspension of conventional type.

Above the clamp 7 a nut 12 is threaded onto the steering post 4, with its flat bottom facing upwardly, and serves to limit the axial movement of the post relative to its tube 3 in the well known manner. A counter nut 13 is likewise threaded on the steering post, and an annular friction disk 14 is clamped between these two nuts 12 and 13. The friction disk 14 is provided on its inner margin with a plurality, for instance four as shown, of extensions or teeth 15 (Fig. 3) for engagement in the corresponding longitudinally directed grooves 16 in the steering post 4. Above the supporting friction disk 14 are readily rotatably arranged about the cylindrical shaft of the counternut 13 the damping disks 19 and 19', of elastic material, for instance leather. Between these two disks 19 and 19' is mounted the intermediate friction member 20, which is held in rigid relative position by the bent arm 21, the lower forked end of which is suitably secured to the frame, for instance, as shown, to a frame flange 23 by means of bolts 22.

A further friction disk 24 is provided at its outer half-periphery, opposite to the supporting arm 21 of the intermediate friction member 20, with a downturned ledge 25, whose median cut-out 26 and terminal vertical edges cooperate with the corresponding teeth 27 of the supporting disk 14, as shown in Figs. 2 and 3, whereby the upper friction disk 24 is unrotatably connected to the supporting disk 14.

Upon the upper end of the steering post is further mounted the dished spring member 28 which is pressed onto the upper friction disk 24 by an adjusting nut 29 threading on the steering post. The handle portion or cap 30 of this nut 29 is internally provided with projections 31 (Fig. 2) in between which engage the two upturned portions of the two-armed safety spring member 33 (Fig. 4) the annular body portion of which is mounted on the steering post between the adjusting nut 29 and the dished spring member 28, and which by cooperation between its internal teeth 34 and the longitudinal grooves 16 of the post 4 is unrotatably connected with the latter. By this means the adjusting nut 29, 30 is prevented, even when loosened, from becoming inadvertently detached.

What I claim is:—

1. In a device of the character set forth, in combination with a cycle frame including a steering tube, a steering post rotatably journalled in said steering tube, spring suspension means for said steering post, and means for limiting the relative axial play of the steering post including an inverted nut threading on the upper end of the steering post, a friction device mounted on the upper end of the steering post above said inverted nut comprising a shafted counter-nut threading on said steering post, a lower annular friction disk unrotatably but slidably mounted on the steering post between said inverted nut and said counter-nut for rotation therewith, circumferential teeth on said lower friction disk, an intermediate annular friction member loosely surrounding the shaft of said counter-nut, and frame-supported means holding this intermediate friction member stationarily relative to the rotatable steering post, an upper annular friction disk presenting a recessed downturned rim extending over substantially one-half its circumference for cooperation with the teeth of said lower friction member for joint reciprocal steering movement, elastic friction annuli respectively interposed between the said three friction members, and adjustable spring-pressure means for controlling the operative frictional contact between the several friction members.

2. In a device according to claim 1, adjustable spring-pressure means for controlling the operative frictional contact between the several friction members, comprising an annular inverted dished spring member resting on said upper friction disk, an adjustable cap member threading on the extremity of the steering post above said dished member and presenting a plurality of internal notches, and means for preventing inadvertent disconnection of said adjustment cap comprising an annular locking member longitudinally slidable on the steering post and two opposed upturned spring arms integrally extending from this locking member for engagement with the notches of said adjustment cap, and means for preventing relative rotation of this locking member on the steering post.

In testimony whereof I affix my signature.

CONRAD BRÜSSELBACH.